(12) United States Patent
Baratakke et al.

(10) Patent No.: US 7,430,580 B2
(45) Date of Patent: Sep. 30, 2008

(54) METHOD AND APPARATUS FOR ADDING RECIPIENTS TO SENT EMAIL

(75) Inventors: Kavitha Vittal Murthy Baratakke, Austin, TX (US); Lilian Sylvia Fernandes, Austin, TX (US); Vinit Jain, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 10/460,422

(22) Filed: Jun. 12, 2003

(65) Prior Publication Data
US 2004/0254989 A1    Dec. 16, 2004

(51) Int. Cl.
*G06F 15/16* (2006.01)
(52) U.S. Cl. .................. 709/206; 709/203; 709/245; 709/246
(58) Field of Classification Search .................. 709/206
See application file for complete search history.

(56) References Cited

U.S. PATENT DOCUMENTS

| | | | |
|---|---|---|---|
| 6,434,601 B1* | 8/2002 | Rollins | 709/206 |
| 6,728,714 B1* | 4/2004 | Doganata et al. | 707/10 |
| 2002/0194278 A1* | 12/2002 | Golan | 709/206 |
| 2004/0068544 A1* | 4/2004 | Malik et al. | 709/206 |
| 2004/0267892 A1* | 12/2004 | Kikinis | 709/206 |

* cited by examiner

*Primary Examiner*—Jason D Cardone
*Assistant Examiner*—Nicholas Taylor
(74) *Attorney, Agent, or Firm*—Duke W. Yee; D'Ann N. Rifai; Peter B. Manzo

(57) ABSTRACT

A data processing system for resending a previously sent email message. A new recipient for the previously sent email message is selected. The new recipient of the previously sent email message is added in response to selecting the new recipient, wherein the previously sent email message is directed to the new recipient and a previous recipient. An indicator to the previously sent email message is added in response to selecting the new recipient, wherein the indicator indicates that the new recipient has been added to a form a new version of the previously sent email message. The new version of the previously sent email message is sent in response to adding the indicator, wherein the indicator causes the new version of the previously sent email message to replace the previously sent email message at an email program of the previous recipient.

7 Claims, 5 Drawing Sheets

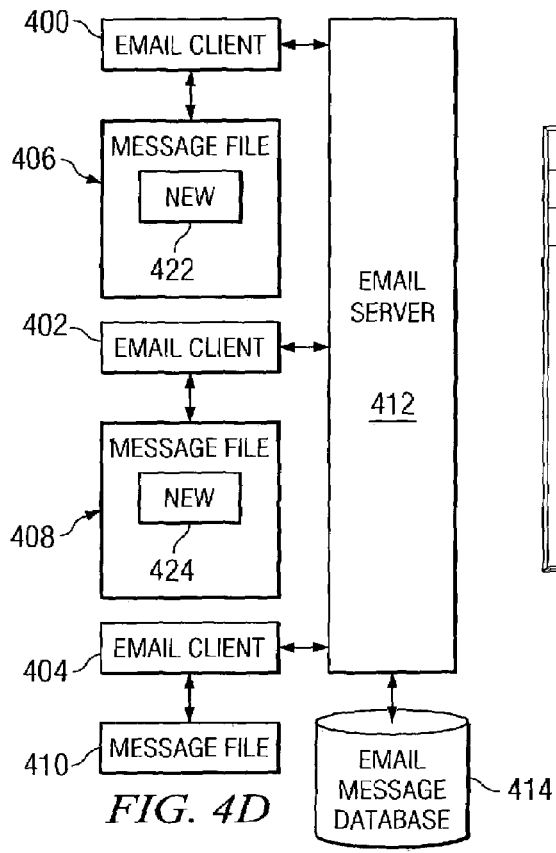
FIG. 4D
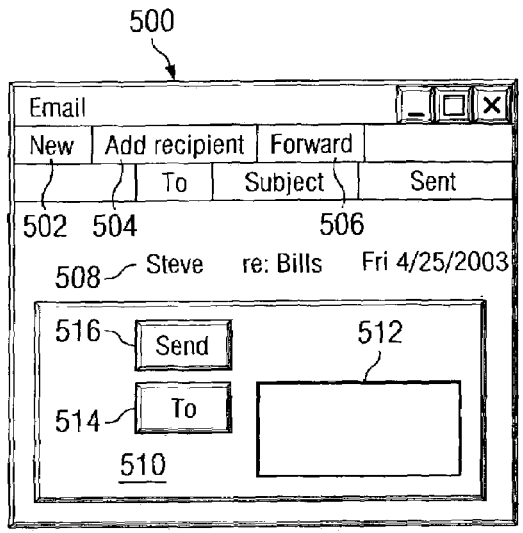
FIG. 5A
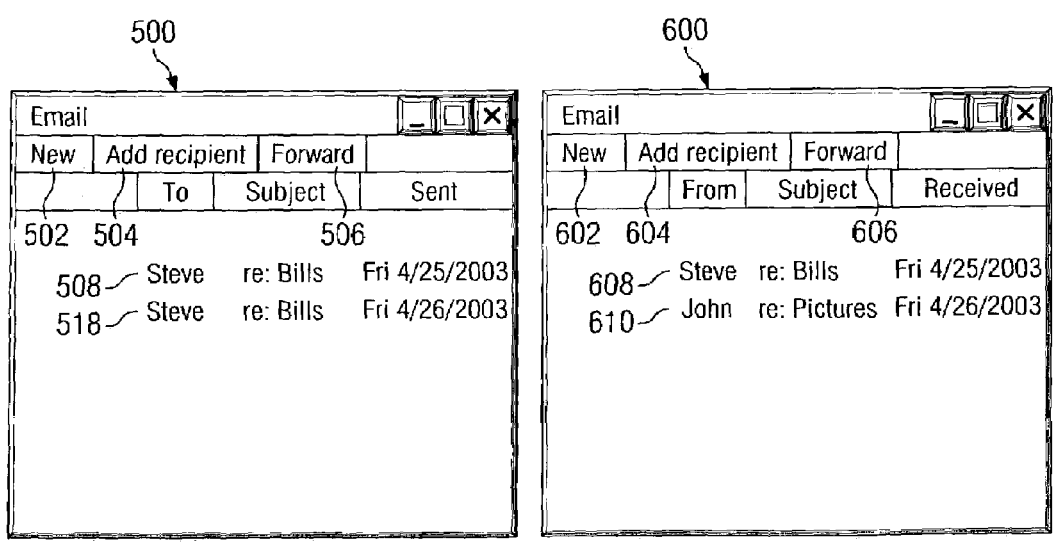
FIG. 5B
FIG. 6A

US 7,430,580 B2

METHOD AND APPARATUS FOR ADDING RECIPIENTS TO SENT EMAIL

BACKGROUND OF THE INVENTION

1. Technical Field

The technical field of the present invention relates generally to an improved data processing system and in particular to a method and apparatus for processing data. Still more particularly, the present invention relates to a method and apparatus for sending email messages.

2. Description of Related Art

One popular use of the internet is for the exchange of electronic mail, also referred to as email messages. An email system typically involves a server-based mail program residing on a server computer to manage the exchange of email messages over one or more networks and a client-based mail program residing on the client to implement a mail box that receives and holds the email messages for a user. Typically, these client-based programs also include a graphical user interface to enable a user to easily and conveniently open and read email messages in addition to creating new email messages.

Users often send email messages to multiple recipients. In some cases, after sending an email message to a number of recipients on a list, the user may realize that this particular email message also should have been sent to other recipients who were not on the original list of recipients. One solution is to forward the original email message to the additional recipients. A problem, however, occurs with this forwarding of the email message. If the additional recipients receiving the forwarded email message reply to all of the addresses in the message, the original recipients would never see the reply. Another solution is to create a new email message with the same content and all of the recipients and then send this email message to all of the recipients. In this case, the prior recipients would have two copies of the same email message. As a result, those recipients, having two copies, may reply to the copy without the additional or new recipients. In that case, those additional recipients would not see these replies.

Therefore, it would be advantageous to have an improved method, apparatus, and computer instructions for resending an email message to additional recipients.

SUMMARY OF THE INVENTION

The present invention provides a method and apparatus in a data processing system for resending a previously sent email message. A new recipient for the previously sent email message is selected. The new recipient is added in response to selecting the new recipient, wherein the previously sent email message is directed to the new recipient and a previous recipient. An indicator is added to the previously sent email message in response to selecting the new recipient. The indicator signifies that the new recipient has been added to form a new version of the previously sent email message. The new version of the previously sent email message is sent, and the indicator causes the new version of the previously sent email message to replace the previously sent email message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A-4D are diagrams illustrating a process for resending email messages to additional recipients in accordance with a preferred embodiment of the present invention;

FIGS. 5A-5B are examples of graphical user interfaces for resending an email message in accordance with a preferred embodiment of the present invention;

FIGS. 6A and 6B are diagrams illustrating a replacement of an email message in accordance with a preferred embodiment of the present invention;

DETAILED DESCRIPTION OF THE PREFERRED EMBODIMENT

Figure 1:
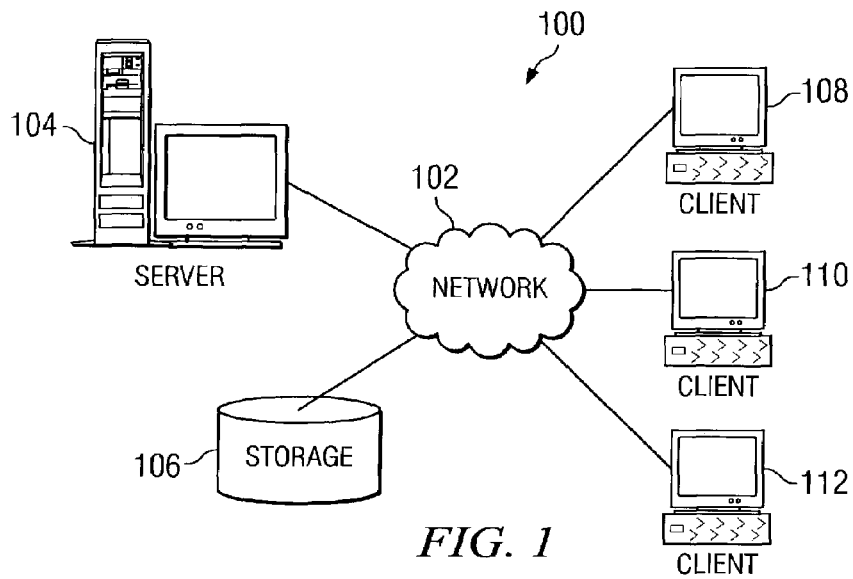
FIG. 1 is a pictorial representation of a network of data processing systems in which the present invention may be implemented.

With reference now to the figures, FIG. 1 depicts a pictorial representation of a network of data processing system in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
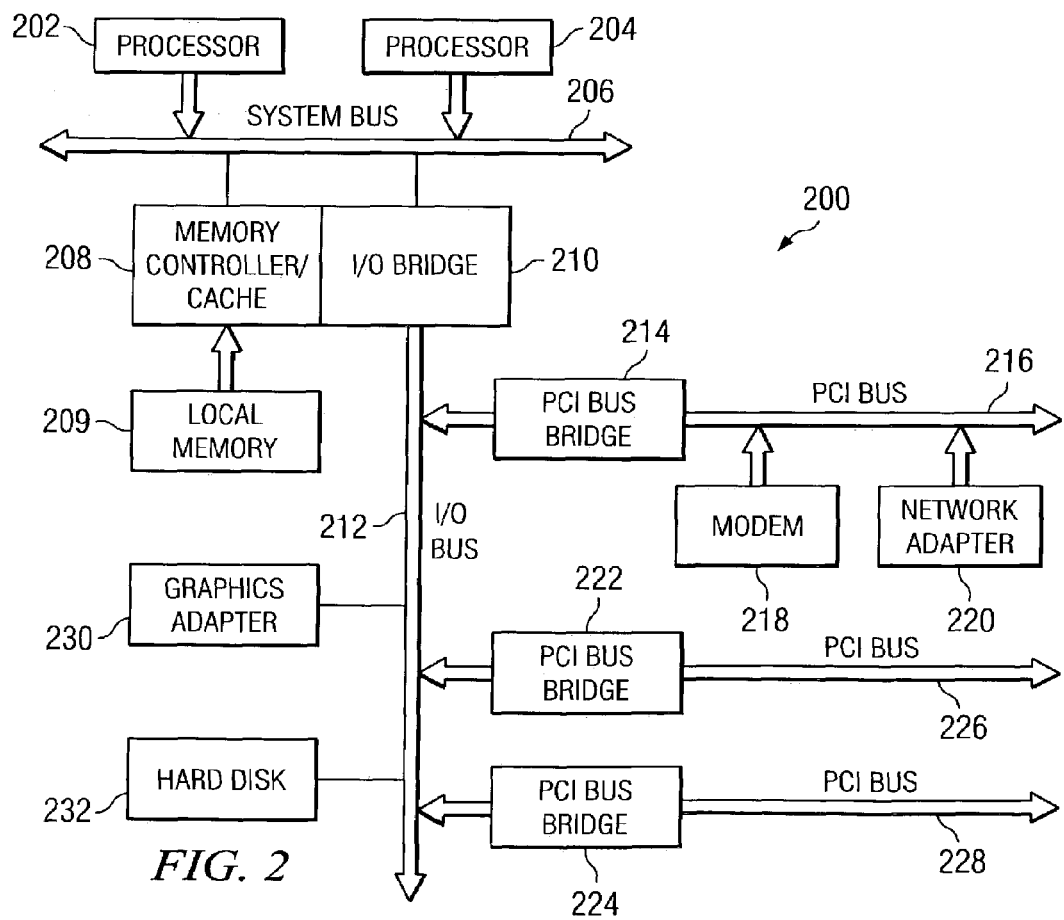
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
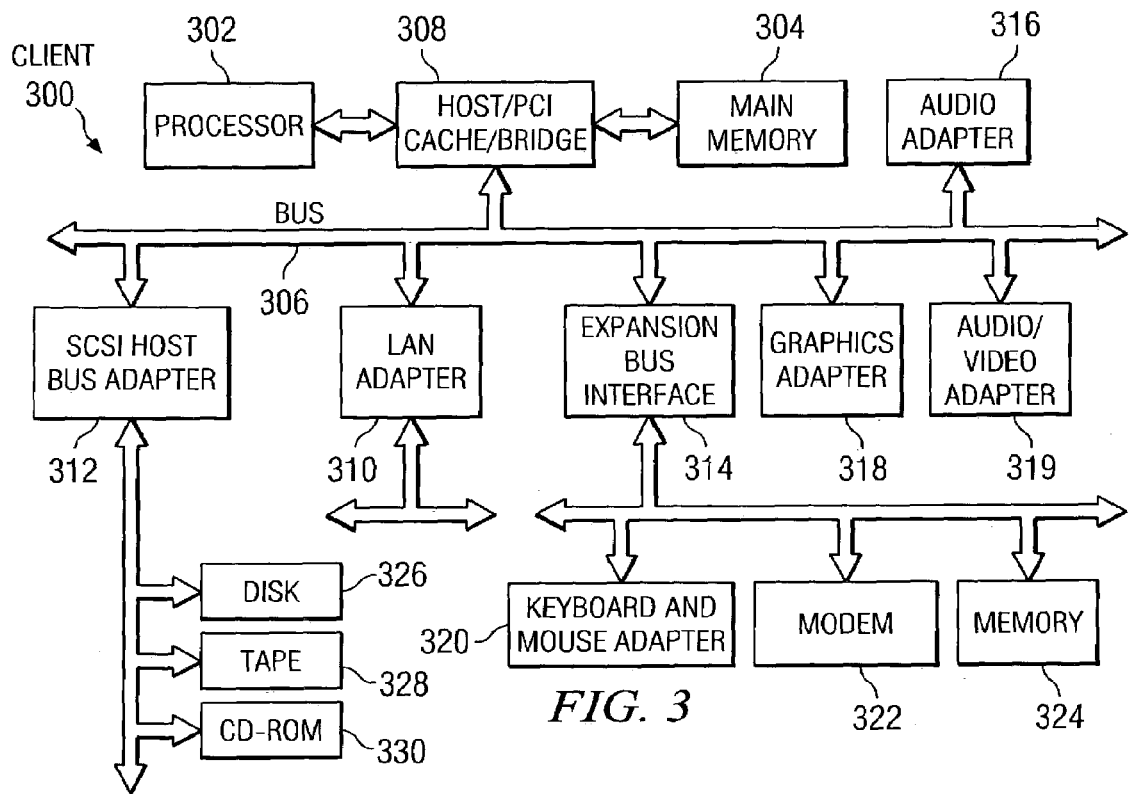
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for allowing the originator of an email message to resend the original email and include additional recipients to this email message. This email message includes an indicator in the form of a tag to indicate that one or more new recipients have been added to the email message. When this new version of the email message is received by the email program of a recipient, the program will search for the original email message.

If the original email message is located, this original message is replaced with the new version email message received by the email program. Now, if the user views the email message, the user will see the additional recipients on the list of recipients. The recipients of the email message, who were not originally on the list, will handle the email message in a normal fashion. Further, programs, which are unable to identify or handle this indicator also will handle the email message in a normal fashion.

Turning now to FIGS. 4A-4D, diagrams illustrating a process for resending email messages to additional recipients is depicted in accordance with a preferred embodiment of the present invention.

In this example, email client 400, email client 402, and email client 404 are email clients located at different client data processing systems, such as client 108, client 110, and client 112 in FIG. 1. Message file 406, message file 408, and message file 410 are associated with these email clients. These message files serve to store email messages received by the clients. These message files may be organized into various mailboxes, such as an in folder, a sent folder, a deleted folder, and an outbox folder.

These email programs may employ different protocols. For example, simple mail transfer protocol (SMTP) is a standard email protocol that is based on TCP/IP. This protocol defines a message format and the message transfer agent, which stores and forwards the mail. Other protocols, such as post office protocol 3 (POP3) also may be employed.

These email programs are used to send mail back and forth to different users through email server 412. Messages sent to other email clients are stored in email message database 414. When an email client connects to email server 412, any messages for that particular client are then sent to the client.

Figure 4A:
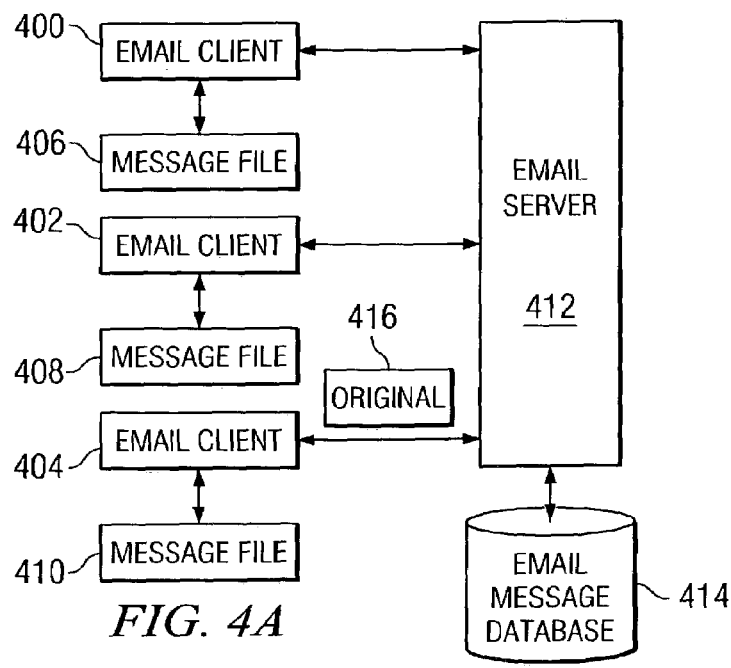
Figure 4B:
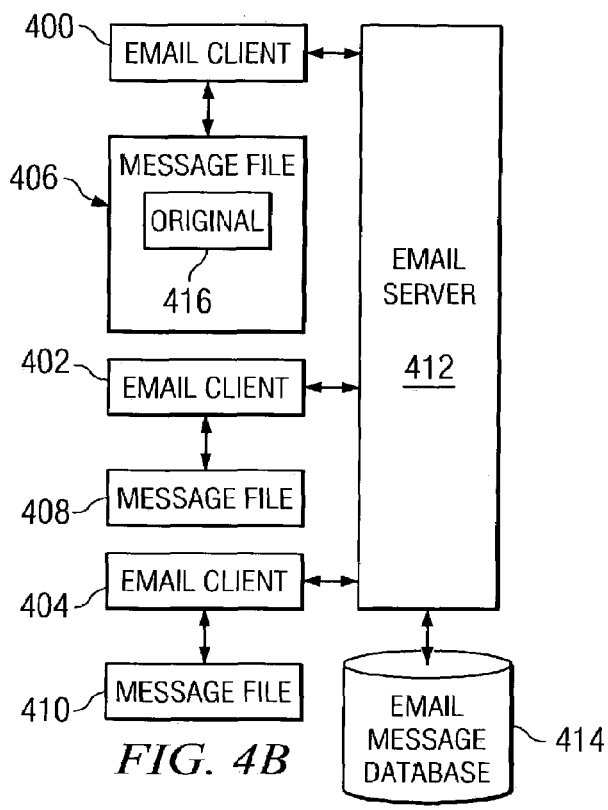
Figure 4C:
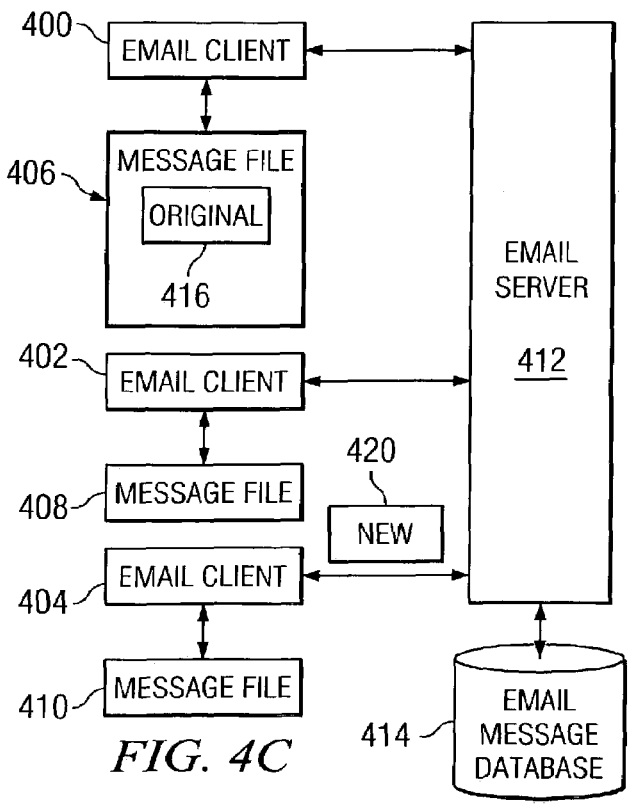

As illustrated, email client 404 in FIG. 4A sends original email message 416 to email server 412. This message is stored in email message database 414 for delivery to different recipients. The recipient is a user at email client 400. In FIG. 4B, email client 400, connects to email server 412 and retrieves original email message 416. In FIG. 4C, the user at email client 404 has decided to send a new version of original email message 416. This new message is new email message 420. This new email message includes an additional recipient in addition to the one stored in message file 406 for email client 400.

New email message 420 is sent to email server 412 for delivery to the recipients. In this example, the additional recipient is a user at email client 402. New email message 420 is the same message as original email message 416. This new email message is only different from original email message 416 in that an additional recipient has been added. Further, new email message 420 also includes an indicator identifying this as a resent email message. This email message is sent to server 412 for distribution to recipients.

In FIG. 4D, copy 422 and copy 424 are copies of new email message 420, which have been sent to email client 400 and email client 402. In this example, email client 402 is the additional recipient of the original message. Copy 424 is stored in message file 408. Message file 406 also stores copy 422. Original email message 416 is replaced by copy 422 in this example.

This replacement occurs when copy 422 is received by email client 400. Copy 422 is parsed to determine whether an indicator, such as a tag is present to indicate that this message is a resent email message including additional recipients. The tag also is referred to as an email header field. This tag may also include a field, such as <SENDER ID, ORIGINAL MAIL ID>. The information in this field may be used by email client 400 to match the duplicate email with the original email.

If a duplicate email message is found, that email message is replaced with the new one that has been resent. In this example, original email message 416 is replaced with copy 422. If the-original email message was deleted, then copy 422 is delivered in a normal fashion. Further, a graphical indicator or some other indicator, such an audio sound may be used to indicate that copy 422 is a replacement for another email message.

In email client 402, copy 424 is delivered normally. The indicator in copy 424 causes email client 402 to search for a duplicate email message for replacement. In this case, no duplicate email message is found because the user at client 402 was not one of the original recipients of email message 416. Since no duplicate email message is found, copy 424 is delivered normally.

Further, if a user has deleted the original email message, the new email message also is delivered and the user will see the email a second time.

Email clients 400, 402, and 404 may be implemented using presently available email clients with an additional process or feature in which these clients now look for indicators as described above. If one of these email clients is implemented using a legacy email program and does not include the mechanism of the present invention, the indicator in a resent email message is simply ignored. For example, if email client 400 is a legacy email client, copy 422 does not replace email message 416. Instead, the user would see both email messages in this particular instance.

Turning now to FIGS. 5A-5B, example graphical user interfaces for resending an email message are depicted in accordance with the preferred embodiments of the present invention. These graphical user interfaces may be implemented in an email client, such as email client 404 in FIG. 4.

Interface 500 includes a number of buttons or controls used for manipulating email. For example, interface 500 includes "New" button 502, "Add recipient" button 504, and "Forward" button 506. In this example, email message 508 is a previously sent email message that the user desires to resend. In this case, the user selects email message 508 and selects "Add recipient" button 504. In response to this user input, window 510 is presented to the user. Window 510 is a pop-up window in this example in which the user may add additional recipients in field 512. Additionally, the user may select "To" control 514 to select additional recipients from a list. Once all of the additional recipients have been selected for the email message, the user selects "Send" button 506 to send the email message.

In response to selecting "Send" button 516, email message 518 is displayed in the sent folder in FIG. 5B. As can be seen, email message 518 is a duplicate of email message 508 except for that the message has been resent at a later time to additional recipients. In this example, email message 508 was sent on Apr. $25^{th}$ while email message 518 was resent on Apr. $26^{th}$.

Figure 6B:
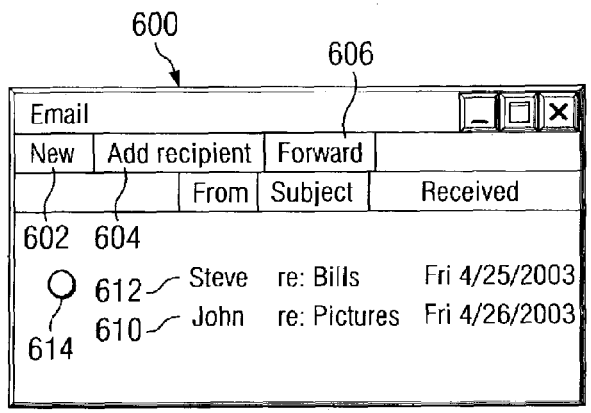

With reference now to FIGS. 6A and 6B, diagrams illustrating a replacement of an email message are depicted in accordance with the preferred embodiment of the present invention. These diagrams illustrate graphical user interfaces that may be implemented in an email client, such as email client 400 in FIG. 4.

In this example, interface 600 is that for an email program. As can be seen, controls such as "New" button 602, "Add recipient" button 604, and "Forward" button 606 are present in interface 600. Email message 608 and email message 610 are email messages received for this particular user.

When an email message is received by the email client, if an indicator is present indicating that the email message is a resent version of a prior email message, the email client searches for the duplicate message. In this case the duplicate message is email message 608, which was received on April $25^{th}$. This email message is replaced with email message 612 which is received on April $25^{th}$. As a result, the user will see the replaced email message the next time the user looks in the in folder. Further, a graphical indicator, such as graphical indicator 614 may be displayed in association with email message 612 to indicate that this is a replaced email message. Additionally, other indicators such as an audio sound may be presented when a resent email message is selected by the user.

Figure 7:
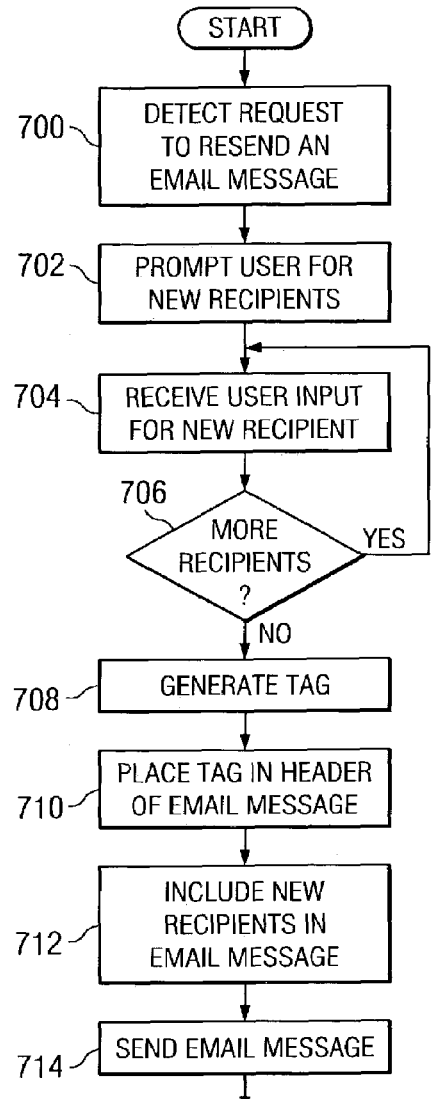
FIG. 7 is a flowchart of a process for resending an email message in accordance with a preferred embodiment of the present invention.

Turning next to FIG. 7, a flowchart of a process for resending an email message is depicted in accordance with the preferred embodiment of the present invention. The process illustrated in FIG. 7 may be implemented in an email client, such as email client 404 in FIG. 4.

The process begins by detecting a request to resend an email message (step 700). In this example, this request may be initiated by a user selecting a control, such as "Add recipient" button 504 in FIG. 5A. In response to this request, a prompt is made for new recipients for the email to be resent (step 702). This prompt may be made through a window, such as window 510 in FIG. 5A. Thereafter, user input is received for a new recipient (step 704). Thereafter, a determination is made as to whether additional recipients are to be added for the email message (step 706). If additional recipients are to be added, the process returns to step 704.

Otherwise, the process generates a tag to be placed into the email message (step 708). This tag is placed in the header of the email message (step 710). Thereafter, the new recipients selected in this process are added to the email message that is to be resent (step 712). The email message is then sent (step 714) with the process terminating thereafter.

Figure 8:
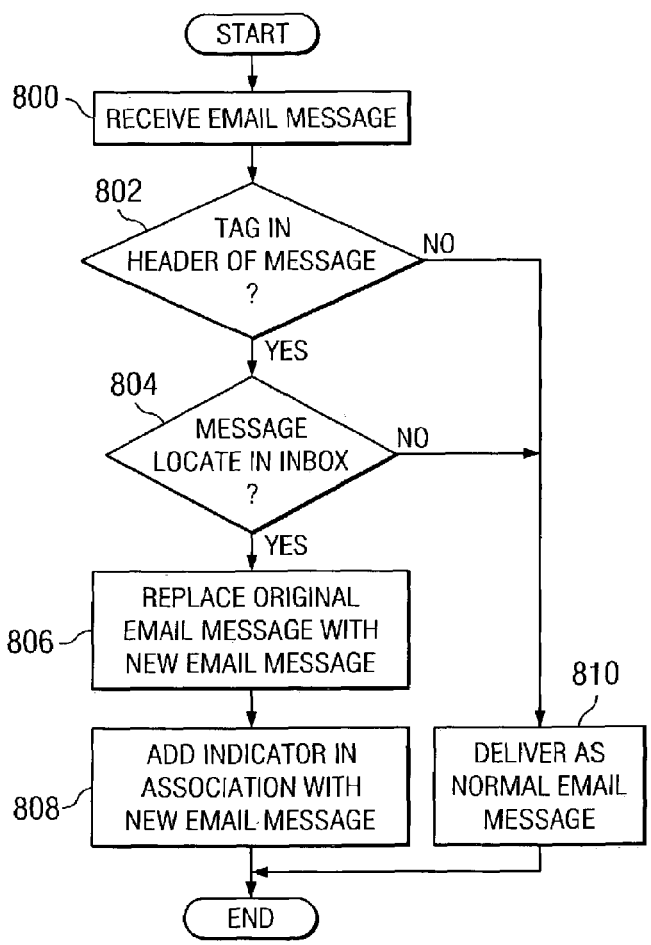
FIG. 8 is a flowchart of a process for handling receipt of an email message in accordance with a preferred embodiment of the present invention.

Turning next to FIG. 8, a flowchart of a process for handling receipt of an email message is depicted in accordance with the preferred embodiments of the present invention. The process illustrated in FIG. 8 may be implemented in an email client, such as email client 400 in FIG. 4.

The process begins by receiving an email message (step 800). A determination is then made as to whether a tag is present in the header of the message (step 802). If a tag is present, a duplicate message is located in the inbox (step 804). This duplicate message is a prior email message that was previously sent, but to fewer recipients in this example. The original email message is replaced with the new email message (step 806). Next, an indicator is added in association with the new email message (step 808) with the process terminating thereafter. In this example, step 808 is an optional step and may be omitted depending on the particular implementation.

With reference again to step 804, if the message is not located in the inbox, then the message is delivered normally (step 810) with the process terminating thereafter. With reference again to step 802, if a tag is not present in the header of the message, the process also proceeds to step 810 as described above. Further, although step 804 looks for messages in the inbox, this step may be expanded to include other folders depending on the particular implementation.

Thus, the present invention provides an improved method, apparatus, and computer instructions for handling resending of email messages. The mechanism of the present invention looks for an older version of the resent email message when a resent email message is received. If an older version is found, this older email message is replaced with the resent email message. A resent email message is identified through an indicator such as a tag located in the header of the email message. Consequently, complications with forwarding email addresses and users responding to an incorrect version of the email address are avoided with this mechanism.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for resending a previously sent email message, the method comprising:

detecting a request to resend a previously sent email, wherein the request is initiated by a user selecting an add recipient button within a graphical user interface of an email program;

responsive to the user selecting the add recipient button, prompting the user for a new recipient for the previously sent email message through a pop-up window that is specifically used to add additional recipients to previously sent emails;

receiving user input for the new recipient for the previously sent email message through the pop-up window;

responsive to receiving the user input for the new recipient, adding the new recipient to the previously sent email message, wherein the previously sent email message is directed to the new recipient and a previous recipient;

responsive to receiving the user input for the new recipient, adding an indicator to the previously sent email message, wherein the indicator indicates that the new recipient has been added to form a new version of the previously sent email message; and responsive to adding the indicator, sending the new version of the previously sent email message, wherein the indicator causes the new version of the previously sent email message to replace the previously sent email message at an email program of the previous recipient, and wherein the indicator causes display of an icon in an in folder mail box by the email program of the previous recipient in association with the new version of the previously sent email message to designate that the new version of the previously sent email message is a replaced email message that includes the new recipient.

2. The method of claim 1, wherein the indicator is a tag located in a header of the new version of the previously sent email message.

3. The method of claim 1, wherein the steps of detecting, prompting, receiving, adding the new recipient, adding an indicator, and sending are located in an email message program.

4. A method in a data processing system for handling receipt of an email message, the method comprising:

receiving the email message;

determining whether an indicator is present in the email message, wherein the indicator indicates that the email message is a new version of a prior email message;

replacing the prior email message with the new version of the email message if the indicator is present in the email message and if the prior email message is present; and displaying an icon in an in folder mail box in association with the new version of the email message to designate that the new version of the previously sent email message is a replaced email message that includes one or more newly added recipients.

5. The method of claim 4, further comprising:

placing the new version of the email message in a mail box if the prior email message has been deleted by the previous recipient.

6. The method of claim 4, wherein the indicator is a tag located in a header of the email message.

7. The method of claim 4, wherein the receiving, determining, replacing, and displaying steps are implemented in an email program.

* * * * *